May 12, 1931.　　F. A. SCRUGGS　　1,805,018
MOLDING MACHINE
Filed Nov. 13, 1929　　3 Sheets-Sheet 1
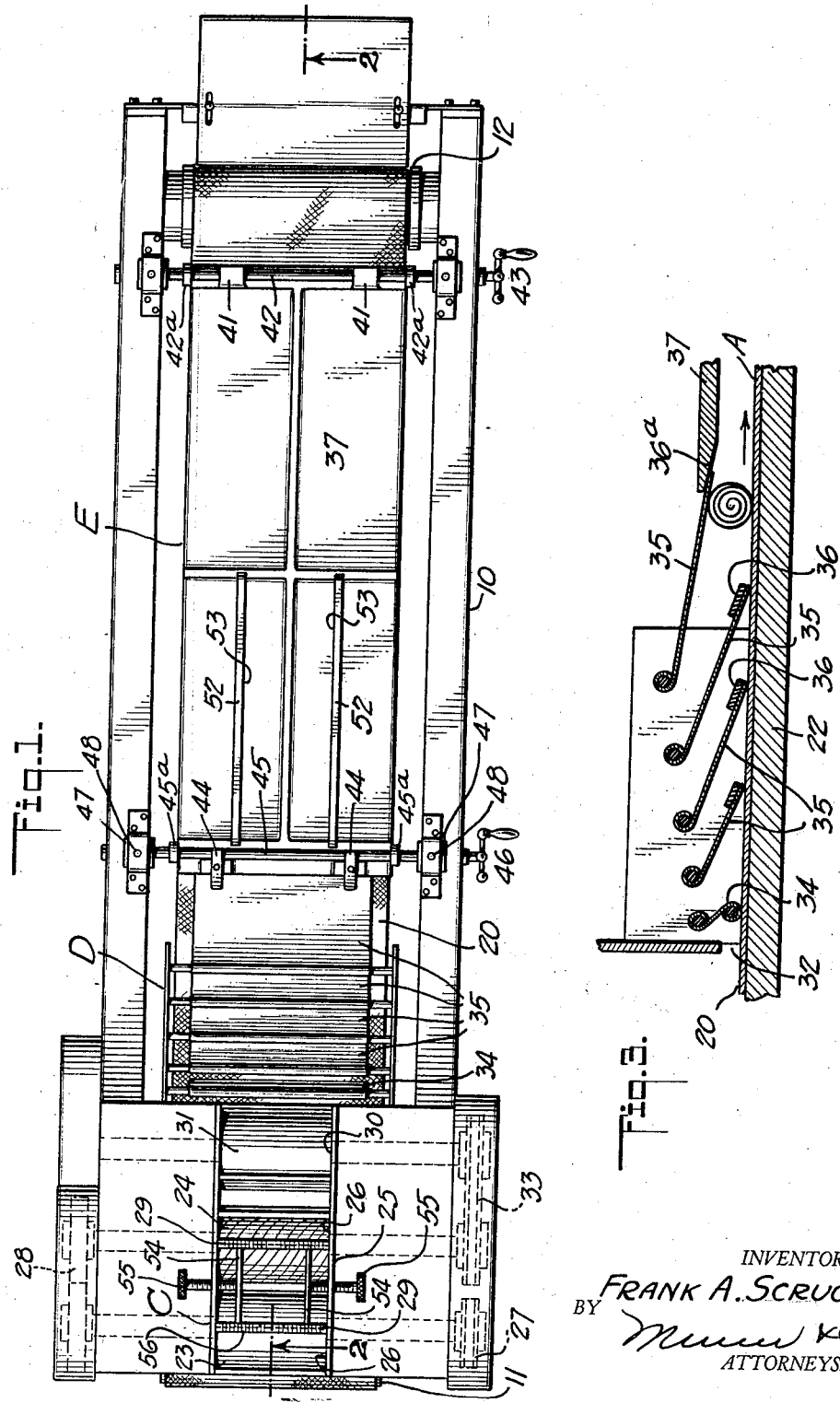
INVENTOR.
FRANK A. SCRUGGS
BY
ATTORNEYS.

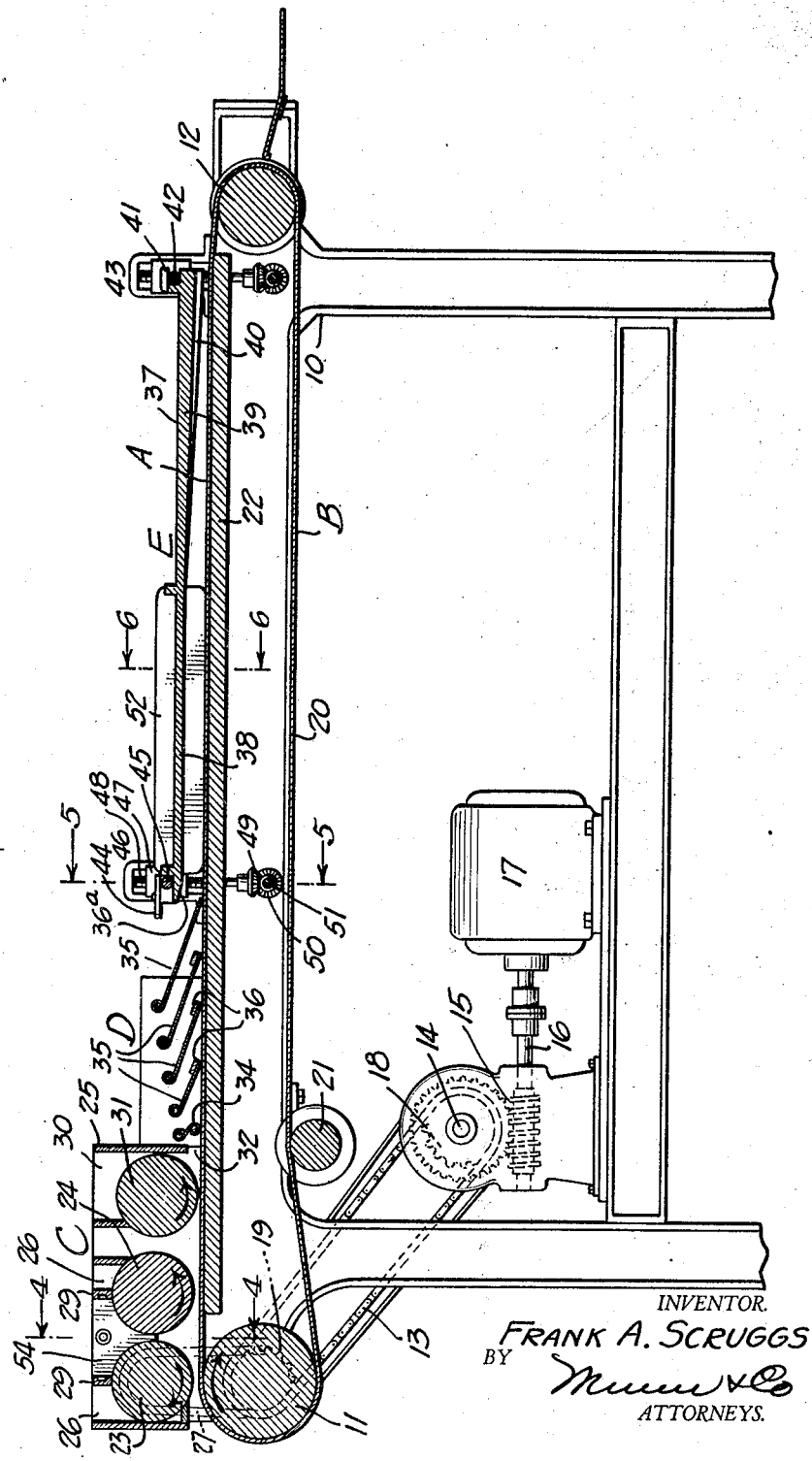

May 12, 1931.  F. A. SCRUGGS  1,805,018
MOLDING MACHINE
Filed Nov. 13, 1929   3 Sheets-Sheet 3
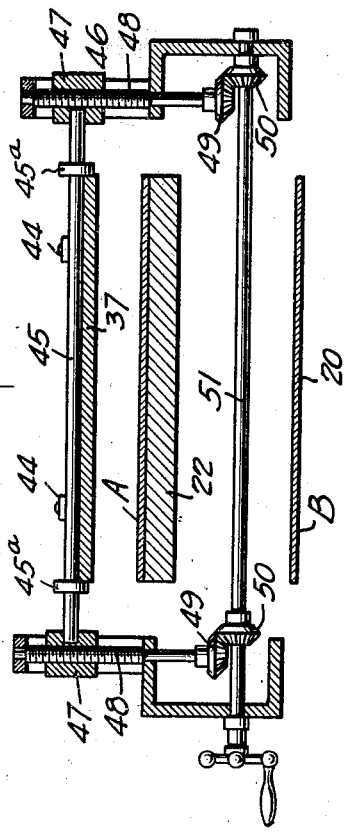
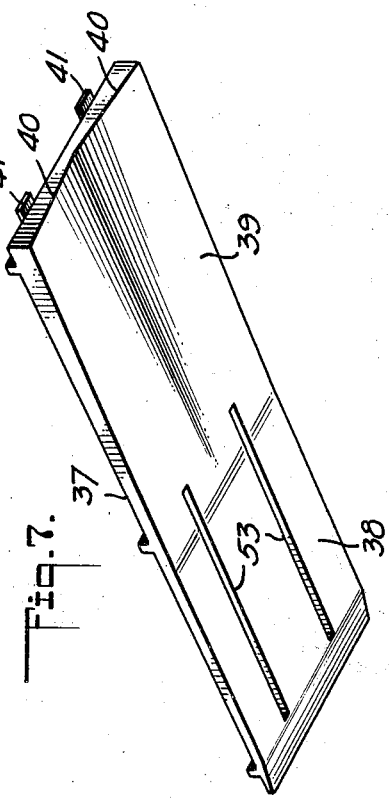
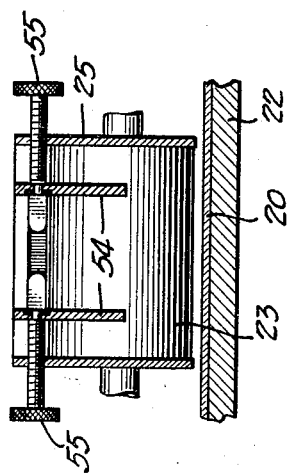
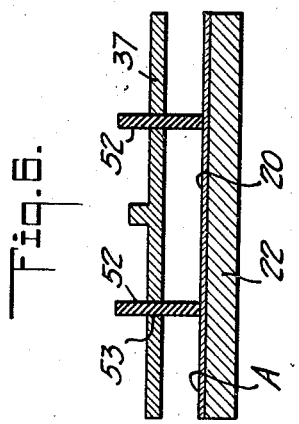
INVENTOR.
FRANK A. SCRUGGS
BY
ATTORNEYS.

Patented May 12, 1931

1,805,018

UNITED STATES PATENT OFFICE

FRANK A. SCRUGGS, OF LOS ANGELES, CALIFORNIA

MOLDING MACHINE

Application filed November 13, 1929. Serial No. 406,892.

My invention relates to molding machines for molding dough into roll or loaf form and is particularly directed to certain improvements in the form of machine set forth in Letters Patent of the United States No. 1,674,229, granted to me on the 19th day of June, 1928.

An important object of the present invention is to provide a novel combination of coacting mechanisms which will serve to greatly increase the capacity of the machine and reduce to a minimum the possibility of retarding the molding operation incident to choked conditions induced by dough failing to progressively move through the various mechanisms during continuous operations of the machine.

Another object of the invention is to provide positively acting dough condensing means and mechanism for insuring operative delivery of the dough thereto.

Another object of the invention is to provide a molding machine whose molding mechanism is flexible to the extent that it may be quickly and conveniently made to adapt itself to respectively varying conditions of the dough stock so that and when the dough is stiff or tough, it will be correctly operated upon in a manner that will not deter other functional characteristics of the machine; chiefly among which functional characteristics is the operation of progressively acting upon the dough to constrict same and then subject same to that treatment which will give a definite or final and intended shape to the dough before it leaves the machine.

A further object of the invention is to provide positively acting coiling mechanism which will insure delivery of the coiled dough to the condensing and shaping means and which, and aside therefrom will operate upon the dough with greater efficiency and expeditiously bring about a perfect coiled condition of the dough.

Another object of the invention is to provide a molding machine having means which will permit of quicker interchangeability therewith of mold boards of respectively varying designs depending upon the shape to be given the dough under treatment.

Another and very important object of the invention is to provide dough flattening means wherein is incorporated novel mechanism for determining the width of the dough and for gaging the width in a way whereby it will, when subsequently coiled, positively adapt itself to the condensing mechanism which I employ and rely upon in the treatment of the dough before it is subjected to the action of the molding or shaping surfaces of the machine.

My invention, therefore, comprises certain new features of construction and arrangement and combination of elements mutually contributing to the accomplishment of new and useful functional attainments which will be hereinafter set forth and pointed out in the claims annexed hereto.

In the drawings wherein a preferred form of the invention is illustrated:

Figure 1 is a plan view of the machine.

Figure 2 is a vertical longitudinal section therethrough on line 2—2 of Figure 1.

Figure 3 is a longitudinal section through a portion of the machine showing the coiling mechanism on an enlarged scale.

Figure 4 is a transverse section on line 4—4 of Figure 2.

Figure 5 is a section on line 5—5 of Figure 2.

Figure 6 is a section on line 6—6 of Figure 2.

Figure 7 is a perspective view of the mold board.

In carrying the invention into practice, I employ a suitable supporting frame 10 of a height where the working parts of the dough handling equipment will be exposed to the convenient reach of the operator of the machine.

Journaled to revolve in the aforementioned frame 10 and at the respective ends thereof, are rollers 11 and 12, the former of which is positively driven by a chain 13 which is operated from the shaft 14 of the power transmitting mechanism 15. This mechanism includes a driven worm shaft 16 connected with a motor 17, the latter, together with said mechanism being supported by the under structure of the frame 10. The shaft 14 is geared at 18 to the worm shaft 16. The chain 13 inter-engages with the gear wheel 19 on the roller 11. An endless carrier belt 20 passes over the mating rollers 11 and 12 and as shown in Figure 2 of the drawings, these rollers are positioned in horizontal alignment in order that the flat top lead A of the belt 20 will occupy a horizontal position at the top of the frame 10. The lower lead B of the belt 20 passes over an idle tensioning roll 21 which may be of any well known construction.

Mounted to occupy a horizontal position in the frame 10 is a flat mold board 22 over which the top lead A of the carrier or translating belt 20 freely passes while in flat dragging contact therewith. This board 22 is approximately of the same length as the frame 10 and the reason therefor will be fully described hereinafter. The board may be mounted stationary in the frame 10 or and instead, it may be of the adjustable construction shown and described in my aforementioned United States Letters Patent No. 1,674,229.

Mounted above the top lead A of the carrier or translating belt 20 are my improved dough flattening, gaging and gas evacuating mechanism C; coiling mechanism D and the dough constricting and shaping means E, all of which are arranged to co-act with each other and with the mold board 22 and the carrier and translating belt 20. I shall now describe these instrumentalities in detail and in the order in which they function progressively.

Two co-acting horizontal rolls 23 and 24 are mounted to revolve in respectively opposite directions in a box structure 25 at the starting end of the machine. These rolls are so related to one another that they act to squeeze and flatten a mass of dough of predetermined weight and cause the dough thus flattened to be delivered onto the top lead A of the belt 20. These rolls are positioned with respect to dust boxes 26 where they will be properly prepared or dusted with flour as they are revolved. The roller 23 is geared to the positively driven roller 11, use preferably being made of a driving chain 27. Power is taken from the roll 23 by means of gears 28 and transferred to the mating roll 24. In this manner, both rolls are positively driven so as to render same highly effective in the work of evacuating the gas from the dough and flattening same previous to a discharge of the dough upon the belt 20. Scraping knives 29 in the boxes 26 serve to clean the rolls 23 and 24 as the latter revolve. In front of the rolls 23 and 24 is an oil or spice hopper 30 in which a positively driven flattening roll 31 is mounted. This roll is closely related to the mold board 22 and the top lead A of the belt 20 so as to co-act therewith and finish the dough flattening operation before the dough enters the coiling mechanism D, which latter is disposed in front of the dough discharge orifice 32 in the box structure 25. The said roll 31 receives its power from roll 24 by means of a transferring belt 33.

The coiling mechanism D overlies the top lead of the belt 20 and same comprises a swinging knocker 34 which is inclined slightly forwardly. It is located immediately in front of the orifice 32 so as to engage with the front end of a previously flattened strip of dough as the latter emerges from beneath the flattening roll 31. It induces initial coiling impact in the dough thus flattened and prepare same for further progressive coiling treatment as the dough successively catches up with the forwardly inclined swinging coilers 35. These coilers 35 are respectively of graduated lengths and the pivot of one coiler is located in stepped relation to the next adjacent coiler. These coilers are preferably constructed from heavy gage sheet metal. They are so related to each other that when one is raised by the action of the advancing dough, it comes against the next adjacent coiler so as to raise same and thereby cause the combined weights of these coilers to act against the dough. By stepping the pivots of the coilers as above described, the coilers successively adapt themselves to the gradually growing diameter of the coil. In order to silence the noise of these coilers, each one is preferably provided upon its inactive face with a cushioning element 36 which is intended to come in contact with the next mating coiler as the dough is being coiled. The coilers have their lower or free edges in dragging contact with the top lead of the belt 20. I find that and incident to this arrangement of the coilers, their intended operations are never interfered with nor in any manner impaired as the dough moves toward the restricting and shaping means E. In other words, there can be no blockade between the dough flattening mechanism and the dough shaping means, and incident thereto, the machine can be relied on to act upon the dough masses in rapid succession. The scheme of operation of the mechanism D is best appreciated upon reference to Figure 3 of the drawings, where it will be observed that the free extremity of the coiler nearest the shaping means E is adapted to abut against the flared face 36a thereof and thus act to guide the coiled dough thereunder. This destroys any possibility of the dough being caught by the adjacent free edge of the means E where it would impede operation of the machine.

The condensing means and dough shaper E comprises a board 37 which is constructed from inflexible material such preferably as aluminum. It is provided with a condensing section 38 and a shaping section 39. The section 38 is of the same thickness throughout the same is formed on its under side with a flat face which on one adjusted position of the board will be parallel to the top lead of the belt 20 and the board 22. It may also assume positions of either forward or rearward angular adjustment so that in one instance the board is higher at its end nearest the coiling mechanism than at the opposite end or vice versa. The shaping section is formed with angularly related flat faces 40—40 which intersect each other medially of the board. These faces are each of a diminishing thickness toward the dough condensing or constricting section 38 so that and no matter what may be the adjusted position of the board, the space between the section 39 and the lower board 22 will gradually decrease in one direction. At one end, the board 37 is formed with integral lugs 41—41 adapted to rest upon the cross bar 42 of a raising and lowering mechanism 43. At the opposite end, the board is provided with pivoted retaining members 44 adapted to engage over the cross bar 45 of a raising and lowering mechanism 46. As both mechanisms 43 and 46 are identical, both in construction and in action, a detail description of the latter will suffice for the former. Upon reference to Figure 5 it is observed that the bar 45 has its ends mounted in vertically sliding boxes 47—47 and that these boxes are operatively associated with worm screws 48 journaled in the frame 10. These screws carry gears 49 which constantly mesh with gears 50 on a manually operated shaft 51. Thus it follows that means are provided for raising and lowering the board at its ends and that independent adjustments can be made to meet given conditions of the dough. With stiff or tough dough, the forward end of the board is lowered so as to increase its pressure against the dough and bring the coiled dough to the desired width. The opposite end can be raised when it is desired to either decrease or increase the pressure of the board against the dough, and regulate same in order that the ends of the dough may be pointed to meet the requirements.

The condensing section 38 of the board is provided with metallic condensing rails or members 52—52 formed of metal and of such weight that their lower faces normally remain in free contact with the upper lead of the belt 20. They are free to work up and down in longitudinal spaced apart slots 53—53 in the board. While I have shown but one removable molding board 37, it should be understood that as many others may be provided as may be necessary and in order that the dough may be made to take certain selected shapes and lengths. In view thereof, it follows that in some cases the condensing members may be farther apart than in other cases. It is important that this feature be borne in mind because of other functional actions of the machine which I shall describe presently. However, and up to this point, it is manifest that after the dough is coiled, it immediately proceeds to the condensing section of the board 37 where it is made to advance in a longitudinal direction with its respective ends in firm contact with the smooth flat inner faces of the members 52—52. In this manner the dough is properly formed with blunt ends so that when it leaves the condensing section it is fully prepared for the shaping treatment to be performed by the action of the respective boards 22 and 37 and mainly the angularly related faces 40—40 of the latter. As the dough proceeds toward the discharge end of the machine it follows that it is progressively shaped and with the use of the board 37 herein illustrated, the dough will be shaped to give it the form of a Vienna roll or loaf as the case may be.

Working in the box structure and between the dough drawing rolls 23 and 24 are gage plates 54—54 which may be adjusted relatively by hand screws 55—55 carried by said box structure. They are adapted to co-act with calibrated surfaces 56 formed on the scrapers 29. These gage plates are intended to function with respect to the size of the space between the members 52—52 so that when a piece of dough of predetermined weight is introduced between the said rolls 23 and 24, thence the single roll 31 and finally the coiling mechanism D, it will, when coiled, be of a length equal to the width of the space between said members 52—52. In this manner, the dough cannot become caught where it would serve as a blockade at the effective entrance to the condensing and shaping means E. I thereby avoid all interruptions in the operation of the machine and have therefore provided new and novel means for increasing the capacity of the machine by permitting it to be run continuously.

It will now be appreciated that I have brought into existence an organized arrangement of working instrumentalities which will be highly dependable. I have furnished ways whereby and on knowing the weight of the dough to be operated upon, same can be treated and drawn so as to evacuate the air therefrom and effect a delivery to the carrier belt of a piece of flat dough ready to be coiled and which, when coiled will be of a precalculated width where it will freely enter the space between the aforementioned dough condensing members 52—52.

The bars 42 and 45 respectively are each provided with spacers 42$^a$ and 45$^a$ adapted to engage with the respective side edges of the top board 37 to hold the latter against lateral movement on the said bars. This acts to hold the board against shifting laterally with respect to the lower board 22.

I claim as my invention:

1. In a mechanism of the class described, a dough carrier, means associated with the carrier for successively condensing, distending and shaping a mass of dough while in transit, and a coiling mechanism above the carrier and positioned with respect to the condensing, distending and shaping means to cause transference of the coiled dough thereto, said coiling mechanism comprising a series of vertically swinging flat members inclined in the direction of the condensing, distending and shaping means and having their axes mounted in progressively stepped relation in the same direction, and having portions adapted to freely rest upon the carrier and in the path of movement of dough upon the carrier.

2. In a mechanism of the class described, a dough carrier, means associated with the carrier for successively condensing, distending and shaping a mass of dough, coiling mechanism above the carrier and positioned with respect to the condensing, distending and shaping means to cause transference of the coiled dough thereto, said coiling mechanism comprising a series of vertically swinging flat members inclined towards the condensing, distending and shaping means and having their axes mounted in progressively stepped relation towards the condensing means and having portions adapted to freely rest upon the carrier and in the path of movement of dough upon the carrier, and means for operating upon the condensing, distending and shaping means for applying respectively varying pressures to the dough.

3. In a machine of the class described, dough flattening means, dough coiling means in advance of the flattening means, a pressure board, means for independently raising and lowering either end of the pressure board, said means comprising interconnected gear operated vertical screw members adjacent either side of an end of said board and sliding boxes carried at either side of said board and coperating with said screw members, a second board underlying the first said board, and a carrier movable between both boards, and under the dough flattening means and the said coiling means for causing successive presentation of a mass of flattened dough to the respective actions of the coiling means and the said two boards, the pressure board having a dough condensing section and a dough shaping section, and spaced apart members movable vertically in the condensing section and having portions in free contact with the carrier and serving to mutually provide a dough constricting space between the coiling means and the aforementioned shaping section of the pressure board.

4. In a machine of the class described, dough flattening means, dough coiling means in advance of the flattening means, a pressure board, means for independently raising and lowering either end of the pressure board, said means comprising interconnected gear operated vertical screw members adjacent either side of an end of said board and sliding boxes carried at either side of said board and cooperating with said screw members a second board underlying the first said board, and a carrier movable between both boards, and under the dough flattening means and the said coiling means for causing successive presentation of a mass of flattened dough to the respective actions of the coiling means and the said two boards, the pressure board having a dough condensing section and a dough shaping section, and parallel spaced apart members movable vertically in longitudinal slots formed in the condensing section and serving to act upon a previously coiled mass of dough and condense the mass before the latter is subjected to the action of the shaping section.

5. A machine for working, shaping and molding dough having a coiling mechanism interposed between the shaping means of the machine and the flattening means, the said coiling mechanism comprising a series of swinging plates whose lower edges are free to rest upon a carrier belt, the said plates each being inclined in the direction of the shaping means and having their axes mounted in progressively stepped relation in the same direction, and a knocker between one of the plates and the flattening means.

6. A machine of the class described comprising spaced apart superposed pressing boards, a carrier movable between the boards, and a mechanism for independently moving either end of the top board with respect to the lower board, said mechanism comprising a pair of interconnected vertical screw members adjacent either end of said top board and a pair of sliding boxes at either end of said board and carried thereon, said boxes having screw threaded bores adapted to cooperate with said screw members and means for operating one pair of screw members simultaneously and independently of said other pair.

7. A machine of the class described comprising superposed shaping boards, a carrier working between the two boards, and a coiling mechanism co-acting with the two boards and with the carrier, and comprising a series of spaced apart angularly disposed plates each mounted in progressively stepped relation for swinging movement, all of the plates mutually co-acting to progressively coil a previously flattened strip of dough, one of the plates serving to engage a portion of the top board so as to form a dough guide to the space between both boards.

8. A machine of the class described comprising a lower mold board, an upper mold board, a dough carrier operating to convey dough between both boards, means for adjusting the upper board with respect to the lower board said means comprising a pair of interconnected vertical screw members adjacent said upper board and sliding boxes having screw threaded bores carried by said upper board and adapted to cooperate with said screw members, means to removably connect the upper board with the adjusting means, and means for holding the upper board against relative lateral movement with respect to the lower board.

FRANK A. SCRUGGS.